(12) United States Patent
Sin et al.

(10) Patent No.: US 7,907,718 B2
(45) Date of Patent: Mar. 15, 2011

(54) VOIP CALL ROUTING

(75) Inventors: Sam K. Sin, San Jose, CA (US); Jan Fandrianto, Los Gatos, CA (US)

(73) Assignee: Cisco Technology, Inc., San Jose, CA (US)

(*) Notice: Subject to any disclaimer, the term of this patent is extended or adjusted under 35 U.S.C. 154(b) by 1192 days.

(21) Appl. No.: 11/539,838

(22) Filed: Oct. 9, 2006

(65) Prior Publication Data

US 2007/0121602 A1 May 31, 2007

Related U.S. Application Data

(60) Provisional application No. 60/738,147, filed on Nov. 18, 2005.

(51) Int. Cl.
*H04M 7/00* (2006.01)
(52) U.S. Cl. .......... 379/232; 370/401; 379/233
(58) Field of Classification Search ........ 379/232, 379/233, 231, 234, 246; 370/352, 327, 466, 370/401
See application file for complete search history.

(56) References Cited

U.S. PATENT DOCUMENTS

| | | | |
|---|---|---|---|
| 5,544,235 A * | 8/1996 | Ardon | 379/177 |
| 5,774,531 A * | 6/1998 | Johnson | 379/112.01 |
| 6,449,353 B1 * | 9/2002 | Hynes, Jr. | 379/201.01 |
| 6,463,051 B1 * | 10/2002 | Ford | 370/352 |
| 6,801,540 B1 * | 10/2004 | Jeong | 370/466 |
| 6,980,640 B2 | 12/2005 | Rice | |
| 7,333,472 B2 * | 2/2008 | Yang et al. | 370/352 |
| 2001/0026545 A1 * | 10/2001 | Matsumoto et al. | 370/338 |
| 2003/0016810 A1 * | 1/2003 | Milton | 379/242 |
| 2003/0068019 A1 * | 4/2003 | Colemon | 379/88.19 |
| 2004/0057570 A1 | 3/2004 | Power et al. | |
| 2004/0120316 A1 | 6/2004 | McCormack et al. | |
| 2005/0232406 A1 | 10/2005 | Kauppinen | |
| 2006/0023657 A1 * | 2/2006 | Woodson et al. | 370/328 |

* cited by examiner

*Primary Examiner* — Olisa Anwah
(74) *Attorney, Agent, or Firm* — Haynes and Boone, LLP.

(57) ABSTRACT

A method of managing Voice over Internet Protocol (VoIP) calls with an Internet Protocol Private Branch Exchange (IP PBX) is provided, including: receiving at an IP PBX device an incoming call directed to a target telephone number, said IP PBX device storing a contact list parameter including one or more rule fields, each rule field including a telephone number identifier and an associated target extension identifier; searching the contact list parameter to identify the telephone number identifier corresponding to the target telephone number; and routing the incoming call to one or more target extensions corresponding to the target extension identifier associated with the identified telephone number identifier.

20 Claims, 4 Drawing Sheets

401

```
<Contact List> = 4089993000:aa | 4089993001:3001 | 4089993002:3002 |
4089993003:3003 | 4089993004:3004 | 4089993005:3005 | 4089993006:7001 |
4089993007:7002 | 4089993008:3001,3002,3003 | 40899930*:7000
```

402

```
<Hunt Groups> = 7001:1001,1002,name=Sales,hunt=next;4;1 |
7002:1003,1004,1005,name=Support,hunt=next;4;30 | 7000:name=All,7001,7002
```

FIG. 4

VOIP CALL ROUTING

CROSS-REFERENCE TO RELATED APPLICATIONS

This application claims the benefit of priority from U.S. provisional patent application Ser. No. 60/738,147, filed on Nov. 18, 2005, entitled "A Parametric Specification of Hunting/Routing Rules for Incoming Calls in an IP PBX," the disclosure of which is incorporated herein in its entirety.

BACKGROUND

A company wishing to provide telephone service to the members of the company may utilize a private branch exchange (PBX). Each telephone set that connects to and is served by the PBX is referred to as a client station or station. The use of a PBX may help to avoid the burden and cost of separately connecting each of the company's telephone sets to the public switched telephone network (PSTN). In addition, a PBX may provide additional advanced features which may not be achievable by connecting the stations directly to the PSTN. For example, the PBX may provide improved privacy when calling between stations, since conventional calls on the PSTN are transmitted across a public network, which is subject to eavesdropping. In addition, the PBX may provide additional services, such as call park, call pickup, call transfer, and call forward to other stations.

A PBX may be viewed as having two sides: a private side where the PBX exchanges signaling and media information with its client stations, and a public side where it connects to the PSTN to exchange signaling and media information with the telephone company. The PBX's public connection with the PSTN is typically referred to as a trunk, and the public side is typically referred to as the trunk side. In a traditional PBX system, the trunk may be implemented as a T1 or T3 line.

Voice Over Internet Protocol (VoIP) has seen increased widespread usage. Session Initiation Protocol (SIP) is an application-layer control protocol that can establish, modify, and terminate multimedia sessions such as Internet telephony calls. SIP is defined in RFC-3261, "SIP: Session Initiation Protocol," which is incorporated by reference herein in its entirety. An IP PBX is a type of PBX that connects to client stations on the private side via an IP network, and connects to an Internet Telephone Service Provider (ITSP) on the public side via an IP network. The ITSP includes PSTN gateways, which provide PSTN termination services. Where SIP is used as the signaling protocol between the IP PBX and the ITSP, the logical connection between the IP PBX and the ITSP is referred to as a SIP trunk. The IP PBX may route SIP calls received from the ITSP to the target station in the IP PBX's SIP network. Voicemail services for the client stations may also be provided by the ITSP or from a separate voicemail service provider, such as an Internet Voice Mail Service Provider (IVMSP).

The IP PBX typically serves multiple extensions and may be associated with multiple Direct Inward Dial ("DID") numbers. It may be desirable to provide call routing features in an IP PBX that enable the IP PBX to route incoming calls directed to a particular telephone number to one or more extensions based on definable rules.

DESCRIPTION OF THE DRAWINGS

FIG. 4 shows an example Contact List parameter and Hunt Groups parameter.

DESCRIPTION OF EXAMPLE EMBODIMENTS

In the following description, reference is made to the accompanying drawings which illustrate several embodiments. It is understood that other embodiments may be utilized and mechanical, compositional, structural, electrical, and operational changes may be made without departing from the spirit and scope of the present disclosure.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

As used herein, the singular forms "a", "an" and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

In accordance with particular embodiments, a communications device may be configured to route incoming telephone calls to one or more extensions supported by that device. In order to effectuate the call routing, the communications device maintains a contact list including rules defining which extensions to alert when an incoming call to a particular telephone number is received. A Hunt Groups parameter may be used to define a sequence for ringing a plurality of extensions.

Figure 1:
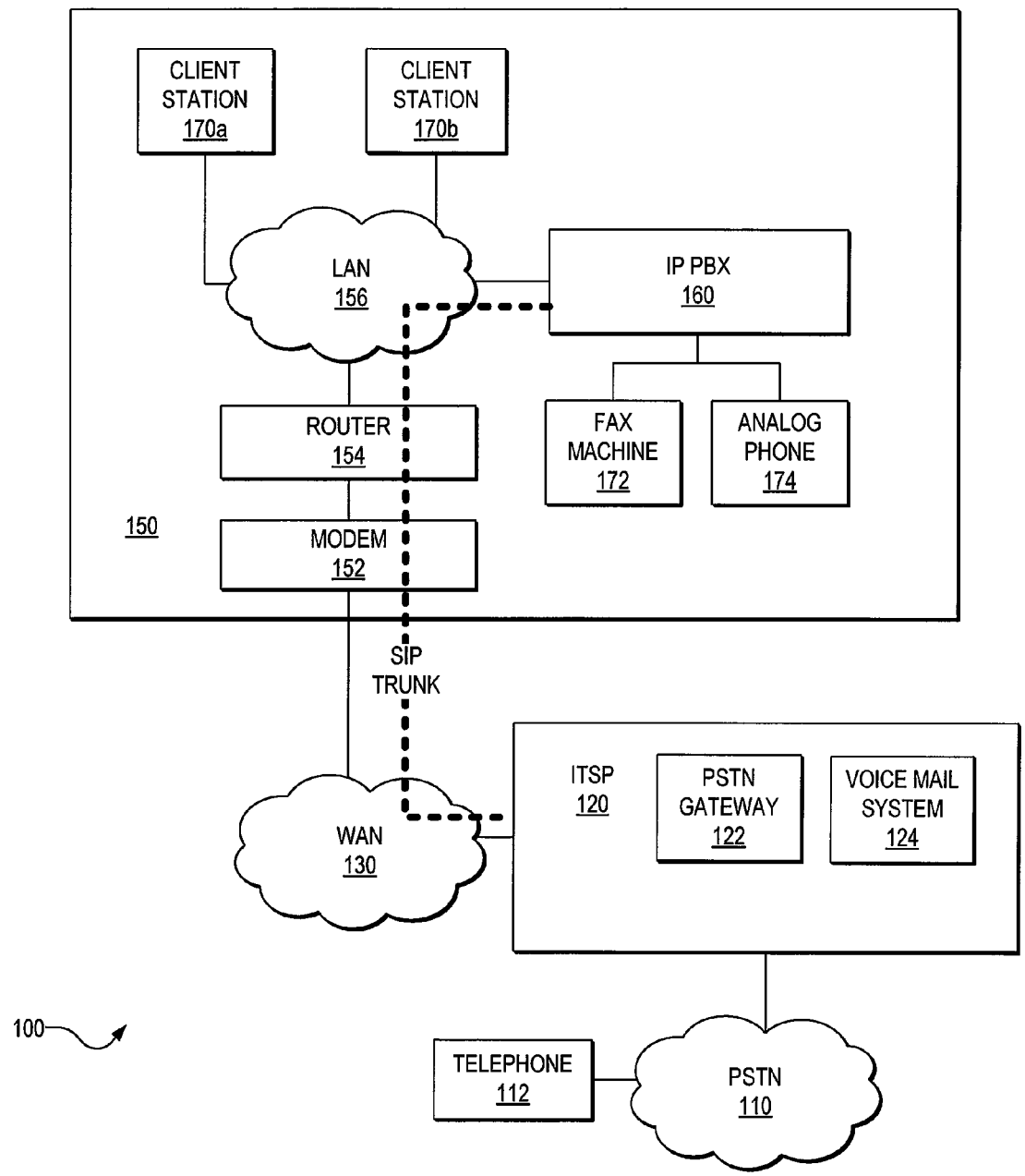
FIG. 1 is a simplified block diagram of an example telecommunications system.

FIG. 1 is a simplified block diagram of an example telecommunications system 100, in accordance with particular embodiments. In this system 100, an ITSP 120 provides the connection between the PSTN 110 and a packet-based network, such as a WAN 130 (e.g., the Internet). The ITSP 120 provides a PSTN gateway 122 which terminates calls originating from telephones 112 on the PSTN 110 to target client stations on the WAN 130. The system 100 also includes a customer location 150, which includes a modem 152 that provides an interface to the WAN 130. A router 154 may provide multiple connections to a Local Area Network (LAN) 156. An IP PBX 160 is provided in the customer location 150 for routing SIP calls received from the ITSP 120.

It will be understood that the arrangement shown in FIG. 1 is merely exemplary and other variations are possible. For example, the IP PBX 160 may provide the routing and/or modem function in addition to providing the telecommunications functions as will be described in further detail below. The IP PBX 160 may also operate as an Analog Telephone Adapter (ATA) and include two Foreign Exchange Station (FXS) ports for connection with an analog telephone 174, a fax machine 172, or a music source adapter. The IP PBX 160 may also contain components that operate as a SIP proxy server and media proxy server, as will be described in greater detail below. Finally, the IP PBX 160 may contain components that serve as a configuration server, which serves configuration files to client stations and auto-configures unprovisioned client stations, and as an application server for supporting advanced call features, such as call park/pickup, directory, directed call pickup, and group paging.

Figure 2:
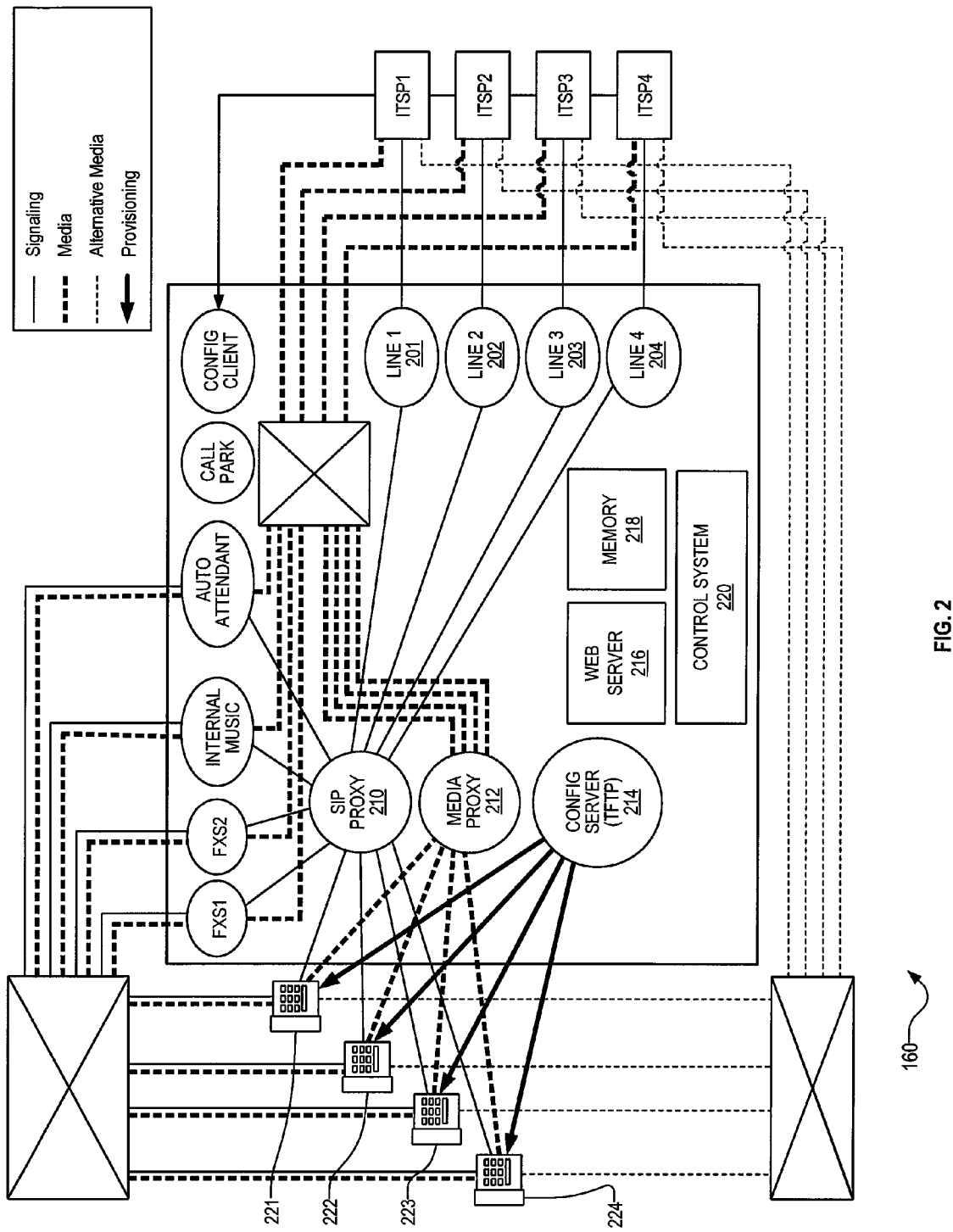
FIG. 2 is a simplified block diagram showing the architecture of an IP PBX.

FIG. 2 is a simplified block diagram showing the architecture of an IP PBX 160, in accordance with particular embodiments. The IP PBX 160 includes one or more logical line interfaces (e.g., four line interfaces 201-204, as shown in FIG. 2). Each line interface 201-204 corresponds to an ITSP SIP account from which the IP PBX obtains PSTN termination services. Each SIP account is characterized by a User ID (unique within the ITSP domain), and optional password, and a package of features and resources associated with the account based on the service contract between the IP PBX operator and the ITSP. Each line interface 201-204 is logically connected with the ITSP office equipment to realize a SIP trunk. The resources associated with the account may include a main number and/or a group of Direct Inward Dial ("DID") numbers that are allocated to this SIP trunk. Each line interface 201-204 can be configured with the same or a different ITSP, thereby providing connectability with as many different ITSPs as there are line interfaces (e.g., up to four different ITSPs, such as ITSP1-ITSP4, as shown in FIG. 2). An advantage of having a plurality of line interfaces is that a different ITSP may be used for different countries or regions. For example, when a station is used to call a PSTN number in Japan, the IP PBX may be configured to detect the country code dialed and automatically select the line interface associated with a Japanese ITSP.

The SIP proxy server component 210 in the IP PBX 160 accepts Registration from the client stations. The private side of the SIP proxy server component 210 serves the client stations (including external and internal clients) and the public side of the SIP proxy server component 210 interfaces with the ITSP.

In some embodiments, there are 5 internal clients that register implicitly with the SIP proxy server component 210: FXS1, FXS2, Internal Music (IMUSIC), Parking-Lot (PL), and Auto-Attendant (AA). The FXS1 and FXS2 clients correspond to the two physical FXS ports. The IMUSIC client, when called, automatically answers and plays internally stored audio to the caller. PL is used to maintain calls that are parked. AA is a scriptable auto-attendant application which is capable of automatically answering incoming calls with greeting messages, and presenting directory messages that allow callers to select the desired departments or individuals. The FXS1 and FXS2 clients can handle, e.g., up to 2 calls simultaneously. In other embodiments, such as when the FXS1 or FXS2 component of the IP PBX 160 is configured as a Streaming Audio Server (SAS), the FXS1 or FXS2 client may handle up to 10 simultaneous calls. The IMUSIC client can be used to support MOH even if no external audio source is connect to the IP PBX. The PL and AA can handle up to 10 calls simultaneously. A soft limit of less than 10 simultaneous calls may apply when multiple features are executing at the same time. These simultaneous call limits are merely exemplary and may vary, depending on the configuration and hardware of the IP PBX 160. Each line interface 201-204 may act as a Back-to-back User Agent (B2BUA). The B2BUA operates like a user agent towards both ends of a SIP call, and is responsible for handling all SIP signaling between both ends of the call, from call establishment to termination. In other embodiments, one or more of these internal client components may be omitted and/or provided as external clients.

The Media proxy server component 212 routes media between client stations and the ITSPs. In some embodiments, an alternate path may be used for media where client stations exchange traffic directly with the ITSP. The Configuration Server 214 serves configuration files to the client stations over TFTP.

The IP PBX 160 may also include a web server 216 to provide an administration web page to enable an administrator to configure the various parameters of the IP PBX 160. In one embodiment, the configuration web page is divided into two groups: Router and Voice. The Router group web page enables the administrator to view and configure various router settings of the IP PBX 160. The Voice group is further divided into subgroups which allow the administrator to view and configure various voice communications settings of the IP PBX 160, including, for example: information regarding the status of the IP PBX 160, the FXS clients, and the Line Interfaces; system settings; SIP settings; settings related to the provisioning of the IP PBX 160 by an ITSP; and settings related to the FXS ports.

The IP PBX 160 may also include a memory 218 for storing the various configuration settings for operating the IP PBX 160, including a Contact List parameter and a Hunt Groups parameter. In addition, the IP PBX 160 includes a control system 220 for controlling the operation of the IP PBX 160.

Figure 3:
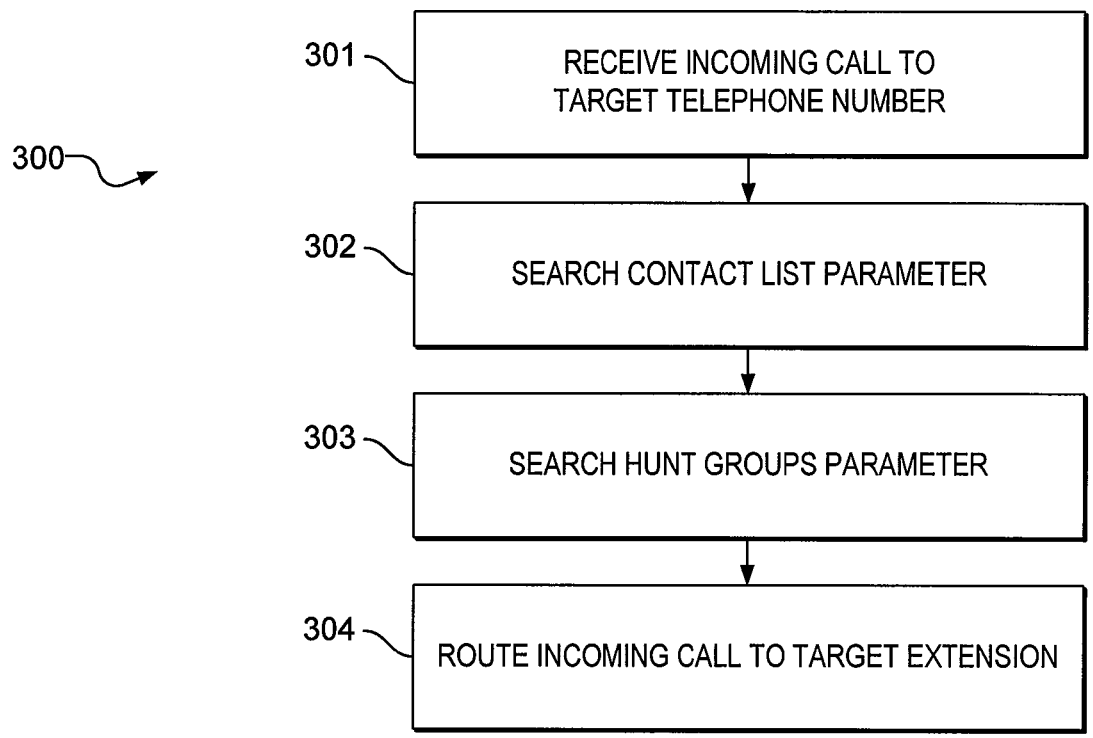
FIG. 3 is a flowchart of a method of managing VoIP calls with an IP PBX.

FIG. 3 is a flowchart of a method of managing VoIP calls with an IP PBX, in accordance with particular embodiments. The IP PBX 160 includes a memory 218 storing a Contact List parameter comprising one or more rule fields, where each rule field comprises a telephone number identifier and an associated target extension identifier. The memory 218 also stores a Hunt Groups parameter comprising one or more group fields, where each group field comprises a group extension identifier and an associated target extension identifier.

In step 301, an incoming call directed to a target telephone number is received at the IP PBX 160. In step 302, the IP PBX 160 searches the Contact List parameter to locate a rule field including a telephone number identifier which corresponds to the target telephone number. Once the rule corresponding to that target telephone number is identified, the target extension identifier for that rule can be obtained. If the target extension identifier associated with the located rule field corresponds to a hunt group extension, then in step 303, the IP PBX searches the Hunt Groups parameter to locate a group field including a group extension identifier which corresponds to the hunt group extension. In step 304, the call is routed to one or more target extensions which are provided in either the Contact List parameter or the Hunt Groups parameter.

The syntax used for the Contact List and Hunt Groups parameters may vary in different embodiments. In particular embodiments, the Contact List parameter includes one or more rule fields (<rule>), each rule field (<rule>) defining a rule for routing incoming calls. Each rule field (<rule>) contains one or more number patterns, with each pattern separated by a comma. Each number pattern may contain a wildcard character (e.g., ? to indicate a single wildcard character or * to indicate a string of wildcard characters), or escape characters (e.g., % xx to indicate "?" or "*" as specific characters, rather than as wildcards). A separator, such as a "|" character, may be used to separate each rule field.

The following is an example Contact List parameter and rule field (<rule>) syntax, wherein angled brackets (< >) donate an item that is to be expanded into or replaced by other items or user input, and square brackets ([ ]) are used to donate optional items.

```
Contact List = "<rule> [| <rule> [| <rule> [|...]]]"
<rule> = "[<didn>:] <ext> [, <ext> [, ...]] [, <cfwd-rule>]"
```

In this embodiment, the Contact List parameter comprises one or more rule fields (<rule>). Each rule field comprises an optional telephone number identifier (<didn>), which specifies the telephone number or numbers associated with the rule. Each rule field also comprises one or more target extension identifiers (<ext>), which identify one or more extensions that the IP PBX should alert when the telephone number matching the telephone number identifier (<didn>) value is called. These extensions may be referred to as "members." If no telephone number identifier (<didn>) is specified, the rule is applied to all telephone numbers.

In addition, each rule field (<rule>) may optionally include a call forward extension <cfwd-rule> that specifies a target extension identifier <ext> indicating where to forward the caller to when no one answers the call at the various extensions specified in the rule field (<rule>). The administrator may set the call forward extension <cfwd-rule> to correspond with, e.g., a voice mail account, or an auto or live attendant. The call forward extension <cfwd-rule> may have the following format:

```
<cfwd-fule> = "cfwd=<ext>"
```

As described above, the target extension identifier (<ext>) value may correspond to an individual extension to which the call should be routed. In some cases, it may be desirable to alert a group of extensions regarding incoming calls. If it is desired to alert all of the group of extensions simultaneously, then those extensions may be listed in the rule field (<rule>) separated by commas. Alternatively, it may be desirable to alert a group of extensions in accordance with some predetermined pattern. This group of extensions to be alerted is referred to as a hunt group. In addition to being alerted simultaneously, other hunting rules can be used to hunt for a station in the group sequentially. The hunt groups may be defined using the Hunt Groups parameter, whereby each hunt group is assigned a hunt group extension. As a result, each hunt group can be referenced in the rule fields (<rule>) of the Contact List parameter in the same way as normal phone extensions.

The Hunt Groups parameter may include one or more group fields (<group>), where each group field (<group>) defines a set of extensions that are associated with that hunt group extension. The following is an example Hunt Groups parameter and group field (<group>) syntax:

```
Hunt Groups = "<group> [| <group> [|...]]"
<group> = "<group-ext>:[<group-name>,]<ext>[,<ext>[,....]][,<hunt-
rule>][,<cfwd-rule>]"
```

In this embodiment, the group extension identifier (<group-ext>) is the virtual extension of the hunt group, and the target extension identifiers (<ext>) following the group extension identifier (<group-ext>) are the "members" of the hunt group. The group name identifier (<group-name>) may be used to define a string of characters to identify the group extension. The syntax may be as follows, in which <gname> is any string of characters and quotation marks may be used to enclose a string of characters including a space:

```
<group-name> = "name=<gname>"
```

A hunt rule field (<hunt-rule>) may be used to define a process for routing the call to the members of the hunt group. In this embodiment, the hunt rule field (<hunt-rule>) may have the following format:

```
<hunt-rule> = "hunt=<algo>;<hunt-time>;<total-time>"
```

The hunt rule field may include a hunt algorithm identifier (<algo>), a hunt time identifier (<hunt-time>), and a total time identifier (<total-time>). The hunt algorithm identifier (<algo>) specifies one of a plurality of predefined algorithms for routing the call to the members of the hunt group. For example, the predefined algorithms may include "restart", "next", or "random".

The "restart" algorithm indicates to the IP PBX that the call should always be routed first to the first member listed in group field (<group>). Accordingly, each time the hunt group is called, the IP PBX will always attempt to route the call to the first listed extension before attempting to reach the subsequent extensions. This may be useful where one designated person should always be the primary recipient for incoming calls to that number, with other individuals serving as backups in the event that the designated receiver is unavailable.

The "next" algorithm indicates to the IP PBX that the call should always be routed first to the member listed in group field (<group>) after the most-recently contacted member. Accordingly, each time the hunt group is called, the IP PBX will always attempt to route the call to the next extension in the list. This may be useful where a group of individuals share responsibility for receiving incoming calls to the telephone number, such as in a call center. Therefore, each individual will take turns in receiving calls.

The "random" algorithm indicates to the IP PBX that the call should be routed randomly to one of the members listed in group field (<group>). This algorithm may also be useful where a group of individuals share responsibility for receiving incoming calls to the telephone number.

The hunt time identifier (<hunt-time>) defines the number of seconds that the IP PBX should try to connect to a particular extension before the IP PBX proceeds to the next extension in the hunt group. The total time identifier (<total-time>) defines the number of seconds that the IP PBX should spend in trying to connect the caller to the extensions in the hunt group. The total time identifier (<total-time>) may be useful to prevent a caller from being endlessly routed to each of the extensions in the hunt group without any answer. After the specified amount of time has expired, the IP PBX may be configured to route the caller to any of a variety of extensions. For example, if a call forward extension <cfwd-rule> is provided, then that rule will be executed (e.g., the rule may identify a particular voice mailbox to which the call should be routed). Other implementations can provide a busy tone to the caller, forward the call to the auto-attendant, or forward to a predetermined voice mailbox. In some embodiments, if the total time identifier (<total-time>) is provided with a predetermined no-timeout value (e.g., <total-time>=0), the IP PBX will continue cycling through the list of extensions in the hunt group until someone answers the call or the caller hangs up.

FIG. 4 shows an example Contact List parameter 401 and Hunt Groups parameter 402 that may be stored in the memory 218 of an IP PBX 160, in accordance with particular embodiments.

The Contact List parameter 401 includes ten rule fields which provide a target extension identifier for incoming calls to various telephone numbers. In this example, the first nine rule fields in the Contact List parameter 401 define the call routing for the telephone numbers (408) 999-3000 through (408) 999-3008.

In the first rule field, the telephone number identifier value is "4089993000", and the target extension identifier value is "aa". Therefore, incoming calls directed to (408) 999-3000 are to be routed to a scriptable Auto Attendant application (aa), which will direct the call to the proper party via a call transfer operation.

The second through sixth rule fields indicate that incoming calls directed to (408) 999-3001 through (408) 999-3005 are routed to extensions 3001 through 3005, respectively. These extensions 3001-3005 are associated with individual client stations 170 in the LAN 150 and are routed by the SIP proxy 210 in accordance with standard VoIP signaling methods.

The seventh and eighth rule fields indicate that incoming calls directed to (408) 999-3006 are routed to extension 7001, and incoming calls directed to (408) 999-3007 are routed to extension 7002. These extensions 7001-7002 are hunt group extensions and are defined in the Hunt Groups parameter 402.

In the ninth rule field, the telephone number identifier value is "4089993008", and the target extension identifier value is "3001, 3002, 3003". Therefore, incoming calls directed to (408) 999-3008 are routed simultaneously to extensions 3001, 3002, 3003.

The tenth rule field utilizes a wildcard *, which indicates that all other incoming calls directed to any telephone number starting with (408) 999-30 are to be routed to hunt group extension 7003. In this embodiment, the rule fields in the Contact List parameter are processed sequentially when incoming calls are received, so that any calls directed to (408) 999-3000 are associated with the first rule field and are routed to the Automated Attendant application accordingly. Similarly, calls to (408) 999-3001 through (408) 999-3008 are processed by the second through ninth rules as described above. All other calls, however, are processed in accordance with the tenth rule field and routed to hunt group extension 7003.

The Hunt Groups parameter 402 includes four group fields which provide a target extension identifier for incoming calls directed to extensions 7000 through 7003 in accordance with the rule fields in the Contact List parameter 401.

In the first group field, the group extension identifier value is "7001", the associated target extension identifier value is "1001, 1002", the group name value is "Sales", the hunt algorithm identifier value is "next", the hunt time identifier value is "4", and the total time identifier value is "1". Accordingly, the first group field indicates that calls directed to extension 7001 should be routed to the hunt group "Sales", which includes extensions 1001 and 1002. The IP PBX 160 will direct these calls in series to extensions 1001-1002 according to the "next" algorithm, and will ring each extension for four seconds before proceeding to the next extension. In some cases, the hunt group name, "Sales", may be displayed on a display of the client station when the call is routed to that station. This enables a user at the client station to quickly determine the source of the call.

Normally, the total time identifier value indicates the total number of seconds to continue to try to hunt through the extensions for an answer before giving up. However, in this embodiment, the control system 220 of the IP PBX 160 is configured to recognize that when the total time identifier value is less than the hunt time identifier value, the total time identifier value refers to the number of times to recycle through all of the members of the list, rather than to the number of seconds. In the example shown in FIG. 4, the first group field includes a hunt time identifier of "4" and a total time identifier of "1". Therefore, the IP PBX 160 will first ring extension 1001 for four seconds, then ring extension 1002 for four seconds, and then terminate the call.

In the second group field, the group extension identifier value is "7002", the associated target extension identifier value is "1003, 1004, 1005", the group name value is "Support", the hunt algorithm identifier value is "next", the hunt time identifier value is "4", and the total time identifier value is "30". Accordingly, the second group field indicates that calls directed to extension 7002 should be routed to the hunt group "Support", which includes extensions 1003, 1004, and 1005. The IP PBX 160 will direct these calls in series to extensions 1003-1005 according to the "next" algorithm, will ring each extension for four seconds before proceeding to the next extension, and will continue cycling in sequence through the target extensions for 30 seconds.

In the third group field, the group extension identifier value is "7000", the associated target extension identifier value is "7001, 7002", the group name value is "All", and no values are provided for the hunt algorithm identifier, the hunt time identifier, and the total time identifier. Accordingly, the third group field indicates that calls directed to extension 7000 should be routed to the hunt group "All", which is associated with hunt group extensions 7001 and 7002. Since no hunt algorithm identifier <hunt-rule> is provided, the default action in this embodiment is to ring all members of the group.

The IP PBX 160 will identify the target extensions recursively, so that if a hunt group identifies another hunt group as the target extension, the IP PBX 160 will then route the call in accordance with the second hunt group's parameters. Therefore, calls directed to extension 7000 will first be routed in accordance with the rules for hunt group 7001, as described above. If the IP PBX 160 completes one cycle through extensions 1001 and 1002 without receiving an answer, the call will then be routed in accordance with the rules for hunt group 7002.

As described above, no values are provided for the hunt algorithm identifier, the hunt time identifier, and the total time identifier. The control system 220 for the IP PBX 160 may be configured to apply default values when no other values are provided in either the Contact List and/or Hunt Groups parameters.

When an incoming call is received by the IP PBX 160, the control system 220 may be configured to determine the target telephone number in a variety of ways. For example, the DID number may be provided in a header of the SIP INVITE message routed from the ITSP 120. The control system 220 then searches for this DID number in the Contact List parameter and will route the call according to the rules contained therein.

The following is a portion of an example SIP INVITE message corresponding to an incoming call that may be sent from the ITSP 120 to the IP PBX 160:

```
INVITE sip:4089993000@itsp1.com SIP/2.0
To: <sip:4089993003@itsp1.com>
```

In this case, the incoming call is direct to the telephone number 408-999-3003. The IP PBX 160 will then search the Contact List parameter to determine how to route this call.

In another embodiment, the target telephone number for the incoming call may be identified elsewhere in the SIP header, such as in a DIDN parameter in the TO header of the INVITE message, as follows:

```
INVITE sip:4089993000@itsp1.com SIP/2.0
   To: <sip:4089993000@itsp1.com>;didn=4089993003
```

In some cases, the target extension identifier (<ext>) for a first hunt group may include a hunt group extension associated with a second hunt group. In this case, when the call is routed to the second hunt group extension, the call will then be routed according to the hunt algorithm for the second hunt group. For example, the Hunt Groups parameter may define the first and second hunt groups as follows:

```
Hunt Groups = 2001:name="Sales
Team",3001,3002,2002,hunt=restart;10;30|
2002:name="Receptionists",4001,4002,4003,hunt=restart;10;30
```

In this case, calls to extension 2001 will be routed first to extension 3001, which will ring for 10 seconds. Then, if the call is not answered, the call will be routed to extension 3002, which will ring for 10 seconds. If the call is still not answered, then the call will be routed according to the rules defined by group extension 2002, which is the second group field in the Hunt Groups parameter. Accordingly, the call will be routed first to extension 4001, then 4002, and finally 4003.

This expansion of the target extension identifier (<ext>) can be recursive. That is, if a group field (<group>) contains members that correspond to a group extension (<group-ext>) of another group field (<group>), the expansion shall be performed recursively until no more expansions are possible. An implementation of this expansion should take care to avoid infinite recursion due to configuration error.

Particular embodiments may provide various advantages not provided by prior art systems. By utilizing the Contact List and Hunt Groups parameters, as described above, advanced call routing features may be provided by the IP PBX. The call routing can be easily definable by an administrator using a web-based interface, and can enable a call to be routed to one or more extensions based on the rules provided in the parameters.

While the invention has been described in terms of particular embodiments and illustrative figures, those of ordinary skill in the art will recognize that the invention is not limited to the embodiments or figures described. For example, the precise syntax provided above for various parameters may vary, and different fields may be used. In addition, some fields are described above as being optional, but in other embodiments, these fields may be required.

In the embodiments described above, the Contact List and the Hunt Groups are defined in two separate parameters. In other embodiments, the contact list defining the routing of calls and the hunt group definitions may be provided in the same parameter.

In addition, in some embodiments, the target DID numbers are all defined in the Contact List parameter. The Hunt Groups parameter is then used to route calls directed to extensions associated with a hunt group. In other embodiments, target DID numbers are defined in both the Contact List and Hunt Groups parameters. Therefore, the IP PBX will search through both parameters in determining how to route the call.

Furthermore, particular embodiments may be used to route calls from client stations local to the IP PBX. Therefore, when a user at a client station dials one of the hunt group extensions, the IP PBX will route the call in accordance with the rules defined in the Hunt Groups parameter.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method, comprising:
   receiving at an Internet Protocol Private Branch Exchange (IP PBX) device an incoming call directed to a target telephone number, said IP PBX device storing a contact list parameter comprising one or more rule fields, each rule field comprising a telephone number identifier and an associated target extension identifier;
   searching the contact list parameter to locate a rule field corresponding to the target telephone number;
   determining a target extension identifier and a telephone number identifier for the located rule field;
   searching a hunt groups parameter stored in said IP PBX to locate a group field including a group extension identifier corresponding to a hunt group extension when the target extension identifier corresponds to the hunt group extension in the hunt groups parameter; and
   routing the incoming call to one or more target extensions corresponding to the target extension identifier associated with the telephone number identifier when the target extension identifier does not correspond to the hunt group extension in the hunt groups parameter or the group extension identifier when the target extension identifier corresponds to the hunt group extension in the hunt groups parameter.

2. The method of claim 1, wherein:
   the telephone number identifier or the target extension identifier includes a wildcard character.

3. The method of claim 1, wherein:
   the telephone number identifier corresponds to a plurality of telephone numbers.

4. The method of claim 1, wherein:
   the target extension identifier corresponds to a plurality of extensions.

5. The method of claim 1, wherein:
   the incoming call comprises a Session Initiation Protocol (SIP) call; and
   a DID number is provided in a SIP header of a SIP INVITE message for the incoming call.

6. The method of claim 1, wherein:
   one or more of the group fields in the hunt groups parameter includes:
   the group extension identifier comprising a plurality of phone extensions; and a hunt rule defining a process for routing the call to the plurality of phone extensions.

7. The method of claim 6, wherein:
the hunt rule comprises a hunt algorithm identifier defining an order in which to route the call to the plurality of phone extensions.

8. The method of claim 6, wherein:
the hunt rule comprises a hunt time identifier defining a time period for ringing each of the plurality of phone extensions.

9. The method of claim 6, wherein:
the hunt rule comprises a total time identifier defining a total time period for ringing all of the plurality of phone extensions.

10. The method of claim 1, wherein:
each group field further comprises a group name for display on a target station.

11. An apparatus, comprising:
a network interface for receiving Voice over Internet Protocol (VoIP) calls;
a memory storing a contact list parameter comprising one or more rule fields, each rule field comprising a telephone number identifier and an associated target extension identifier and storing a hunt groups parameter comprising one or more group fields, each group field comprising a group extension identifier and an associated target extension identifier; and
a control system configured to:
receive an incoming call directed to a target telephone number;
search the contact list parameter to locate a rule field corresponding to the target telephone number;
determine a target extension identifier and a telephone number identifier for the located rule field;
search the hunt groups parameter to locate a group field including a group extension identifier corresponding to a hunt group extension when the target extension identifier corresponds to the hunt group extension in the hunt groups parameter; and
route the incoming call to one or more target extensions corresponding to the target extension identifier associated with the telephone number identifier when the target extension identifier does not correspond to the hunt group extension in the hunt groups parameter or the group extension identifier when the target extension identifier corresponds to the hunt group extension in the hunt groups parameter.

12. The apparatus of claim 11, wherein:
the telephone number identifier or the target extension identifier includes a wildcard character.

13. The apparatus of claim 11, wherein:
the telephone number identifier corresponds to a plurality of telephone numbers.

14. The apparatus of claim 11, wherein:
the target extension identifier corresponds to a plurality of extensions.

15. The apparatus of claim 11, wherein:
the control system is configured to receive a Session Initiation Protocol (SIP) call, wherein a DID number is provided in a SIP header of a SIP INVITE message for the incoming call.

16. The apparatus of claim 11, wherein:
one or more of the group fields in the hunt groups parameter includes:
the group extension identifier comprising a plurality of phone extensions; and
a hunt rule defining a process for routing the call to the plurality of phone extensions.

17. The apparatus of claim 16, wherein:
the hunt rule comprises a hunt algorithm identifier defining an order in which to route the call to the plurality of phone extensions.

18. The apparatus of claim 17, wherein:
the hunt rule comprises a hunt time identifier defining a time period for ringing each of the plurality of phone extensions.

19. The apparatus of claim 17, wherein:
the hunt rule comprises a total time identifier defining a total time period for ringing all of the plurality of phone extensions.

20. The apparatus of claim 11, wherein:
each group field further comprises a group name for display on a target station.

* * * * *